G. Z. BURRISS.
LAWN MOWER.
APPLICATION FILED MAR. 10, 1913.
1,120,789.
Patented Dec. 15, 1914.
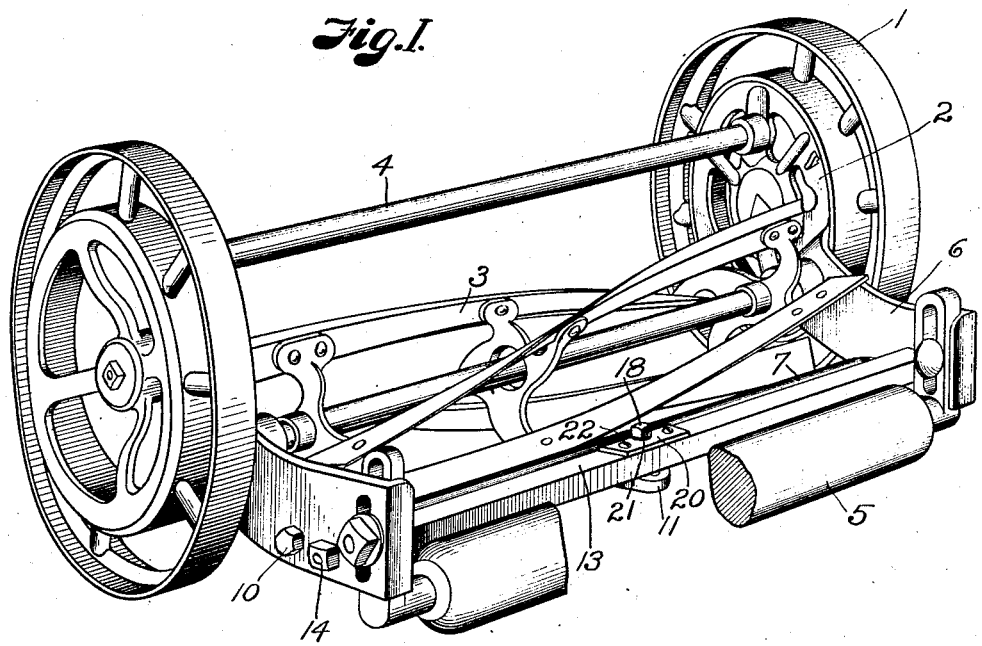
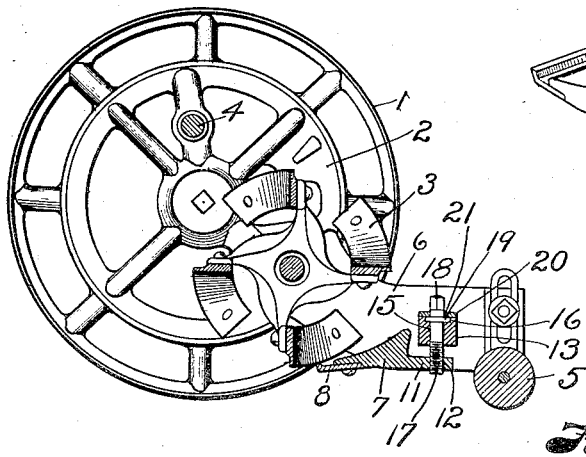
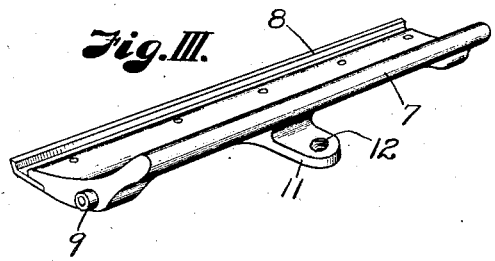
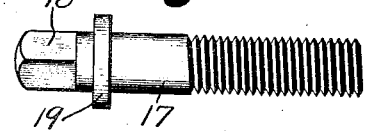
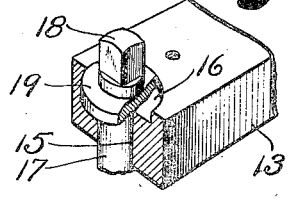
WITNESSES:
Arthur W. Capa,
Leta E. Coats.
INVENTOR
Geo. Z. Burriss.
BY Arthur C. Brown
ATTORNEY

UNITED STATES PATENT OFFICE.

GEORGE Z. BURRISS, OF DELAWARE, OHIO.

LAWN-MOWER.

1,120,789.  Specification of Letters Patent. Patented Dec. 15, 1914.

Application filed March 10, 1913. Serial No. 753,453.

*To all whom it may concern:*

Be it known that I, GEORGE Z. BURRISS, a citizen of the United States, residing at Delaware, in the county of Delaware and State of Ohio, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the letters and figures of reference marked, thereon, which form a part of this specification.

My invention relates to lawn mowers, and more particularly to mowers of the reel and cutter bar type, wherein the cutter bar is adapted for adjustment toward and from the reel in order to secure an even and positive mowing operation. With the majority of mowing machines of this type, two or more operations are required in order to adjust the cutter bar either toward or from the reel, but it is the object of the present invention to provide mechanism whereby the bar may be adjusted either toward or from the reel at a single operation. In accomplishing this object I have provided improved details of structure, the preferred form of which is illustrated in the accompanying drawings, wherein:—

Figure I is a perspective view of a lawn mower, of the general type for which my invention is adapted, part of the roller being broken away to illustrate the mechanism for adjusting the cutter bar. Fig. II is a transverse section of the machine, illustrating the adjusting mechanism. Fig. III is a detail perspective of the cutter bar.
Fig. IV is an enlarged detail of the adjusting screw. Fig. V is a detail perspective of the apertured part of the adjustment beam and a part of the screw.

Referring more in detail to the parts:—
1 designates the ground wheels, 2 the casing frame, 3 the reel, 4 the tie rod and 5 the roller of a lawn mower of any ordinary construction, the type herein shown being merely illustrative of the general class of such machines.

In the rearwardly projecting arms 6, which are preferably integral with the frame member 2, and which carry the roller 5, is pivotally mounted a cutter bar 7 having the usual knife 8 and being of the same general construction as the ordinary cutter bar used in this type of machine, the mounting of the bar on the frame preferably comprising sockets 9 which are projected from the ends of the bar and adapted for pivotal mounting on the cone bearings, the outer ends of which are indicated at 10 that are carried by and project through the frame members 6.

Extending rearwardly from, and preferably formed integral with, the cutter bar 7 is an ear 11 having a threaded aperture 12 therein, and rigidly secured to the arms 6, preferably by bolts 14, and extending between said arms, is a beam 13 which overlies the cutter bar ear and is spaced thereabove to allow the cutter bar to turn on its pivot when under adjustment, as will presently be more fully described.

Extending through the beam 13, in line with the threaded aperture 12 in the cutter bar ear is a bore 15, the upper end of which is enlarged to form a socket 16. Extending through the beam bore 15 is a screw 17, preferably of the lag bolt type, the lower end of which is threaded into the aperture in the ear on the cutter bar, and the upper end of which has a squared head 18 whereby the screw may be manipulated by means of an ordinary wrench. Rigidly fixed on the shank of the screw is a collar 19 which is adapted to seat in the socket 16 in the beam 13. Overlying said collar, and covering the socket, is a plate 20, having an aperture 21, through which the upper end of the screw shank is projected so that the head 18 is exposed while the collar 19 is contained within the beam socket and adapted to bear against the under face of the plate when the screw is turned to the left to adjust the cutter bar toward the reel, and confine the socket at all times, so as to maintain the adjusted position of the cutter bar. The plate 20 may be secured to the upper face of the beam by screws 22, or the like, and is preferably removable in order that the screw may be readily inserted or removed from its seat. A mower having an adjustment of this type may be assembled, and the cutter bar adjusted before the machine leaves the factory. After the mower has been in use for some time it is usually necessary to readjust the cutter bar on account of wear of the reel blades or springing or setting of the various parts. With the mechanism described such adjustment of the entire cutter bar may be made at one operation by turning the screw 17 in either direction according to whether the cutter bar is to be moved toward or from the reel, it being apparent that when the screw is turned toward the right the screw threads will draw the rear end of the cutter bar upwardly, whereas when it is turned toward the left the rear end of the bar will be lowered, in each case moving the front end of the bar in the opposite direction to the movement of the ear 11. It is also apparent that by having the beam 13 rigidly mounted between the frame arms 6, and by confining the screw within the beam, the collar 19 will support the rear end of the cutter bar to limit the upward movement of the bar knife, and will contact the plate 22 to limit the upward movement of the screw and thereby prevent the bar knife from spreading from the reel blades.

It can readily be seen that by mounting the beam and adjusting screw low down on the frame that such parts will not interfere with the delivery of mown grass over the roller, as the cascade of grass will be thrown over the beam and screw.

Having thus described my invention, what I claim as new therein, and desire to secure by Letters-Patent, is:—

In a lawn mower, a carrying frame, a cutter bar pivotally mounted in the frame, a roller mounted in the frame and spaced from the cutter bar, a beam fixed in the frame between the cutter bar and roller, a central ear on the cutter bar projecting beneath said beam, a screw revolubly mounted in the beam and having threaded connection with said ear, a head on said screw, a collar on said screw adjacent said head and an apertured keeper member on the beam overlying the screw collar and surrounding said head.

In testimony whereof I affix my signature in presence of two witnesses.

GEORGE Z. BURRISS.

Witnesses:
ARTHUR W. CAPS,
LETA E. COATS.